(No Model.) 2 Sheets—Sheet 1.

C. M. CONRADSON.
GEAR CUTTER.

No. 527,410. Patented Oct. 16, 1894.

WITNESSES:
James F. Duhamel
Horace A. Dodge.

Conrad M. Conradson,
INVENTOR,
by Dodge Sons,
Atty.

(No Model.) 2 Sheets—Sheet 2.

C. M. CONRADSON.
GEAR CUTTER.

No. 527,410. Patented Oct. 16, 1894.

WITNESSES:
James F. Duhamel
Horace A. Dodge

Conrad M. Conradson,
INVENTOR
by Dodge Sons,
Attys.

UNITED STATES PATENT OFFICE.

CONRAD M. CONRADSON, OF MADISON, WISCONSIN.

GEAR-CUTTER.

SPECIFICATION forming part of Letters Patent No. 527,410, dated October 16, 1894.

Application filed December 2, 1891. Serial No. 413,789. (No model.)

*To all whom it may concern:*

Be it known that I, CONRAD M. CONRADSON, a citizen of the United States, residing at Madison, in the county of Dane and State of Wisconsin, have invented certain new and useful Improvements in Gear-Cutters, of which the following is a specification.

My invention relates to gear cutters, and consists in a novel construction of the same as hereinafter set forth and claimed.

Figure 1:
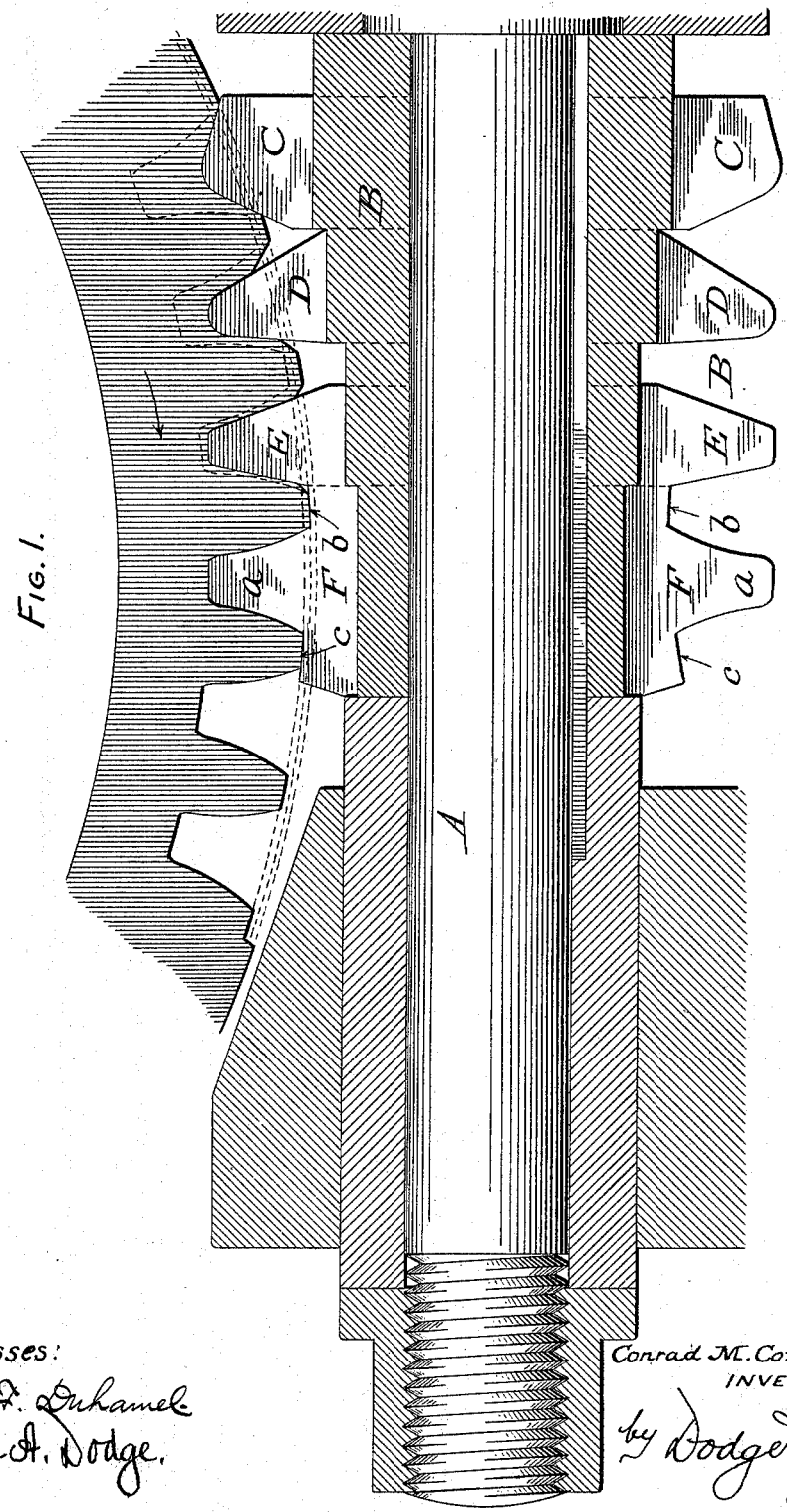
Figure 2:
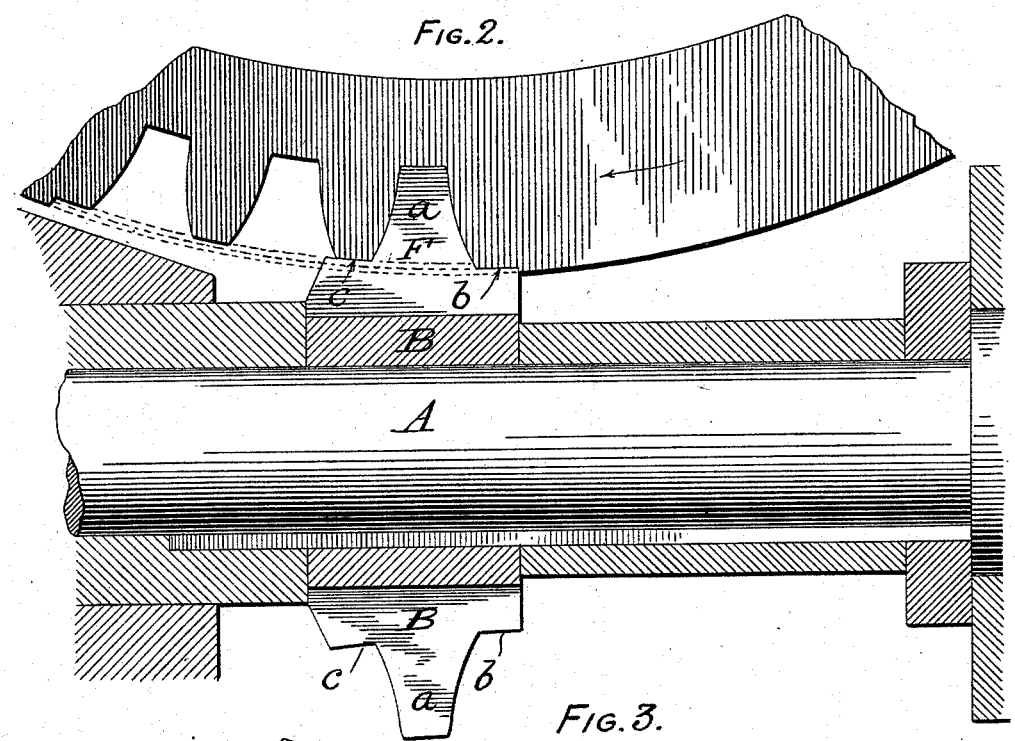
Figure 3:
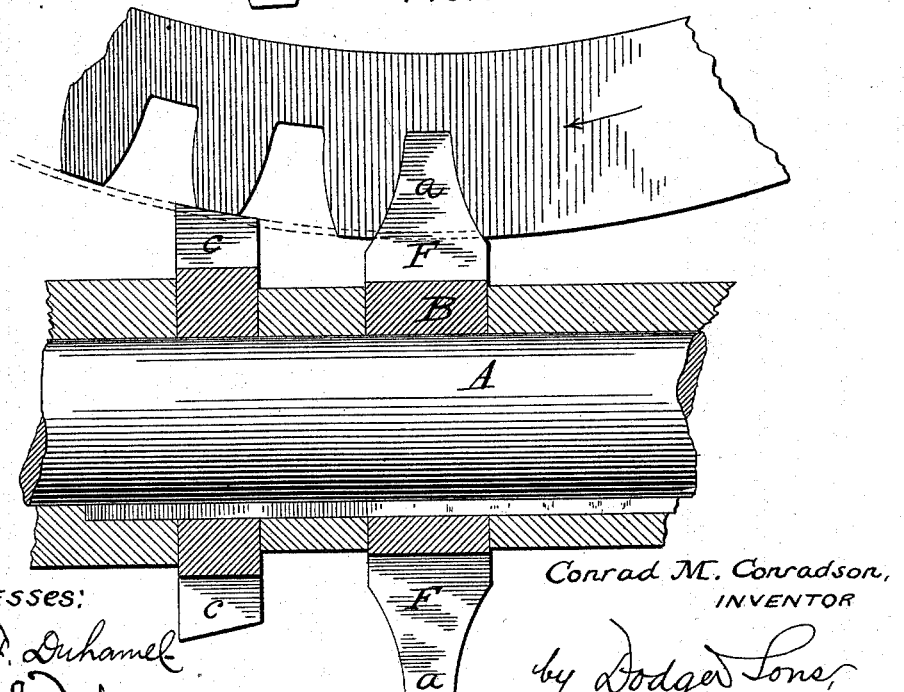

In the drawings,—Figure 1 is a longitudinal sectional view through my cutter as it appears at work; and Figs. 2 and 3, similar views, illustrating slight modifications in the construction or arrangement of the same.

Gear blanks are usually bored, faced, and turned on the outside, in a lathe, before being cut in a gear-cutting machine; but under the present invention I propose to bore and face the blanks on the two sides in any suitable manner, and then cut the teeth and finish the outside, simultaneously, by the use of the gear cutter now to be described in detail, in connection with the accompanying drawings, in which—

A indicates a shaft or arbor journaled in suitable bearings and adapted to be rotated in the same manner as in the ordinary form of gear cutting machines. Mounted upon this shaft or arbor, and keyed or otherwise rigidly affixed thereto, is my improved cutter B, which, in the preferred form, as shown in Fig. 1, comprises the progressive cutting heads C, D and E, and a finishing cutting head F, which latter is designed to give to the teeth the desired form and final dressing.

The cutter comprising the cutting heads C, D, E, and F, may be made of a single integral piece of metal as shown in Fig. 1, or the bits may be made separate as indicated by dotted lines in said figure, and keyed or otherwise rigidly secured upon the shaft or arbor, so that under all circumstances the different parts of the cutter must be rotated or revolved in unison.

The cutting head C, which first acts upon the blank, cuts a V-shaped notch in the periphery of the wheel, while the cutting head D, which is narrower than the cutting head C, works in farther toward the center of the gear blank and enlarges the opening made by the cutting head C. The cutting head E more nearly resembles in form the space between the teeth, and enlarges the opening or notch previously formed by the cutting heads C and D.

The part F is provided with a central cutting bit $a$ of a form in cross section corresponding exactly to the space between two teeth, and with cutting bits or shoulders $b$ and $c$ of different sizes located respectively on opposite sides of the central cutting bit $a$. The cutting bit $b$ works upon the end of the teeth and removes a portion of the metal therefrom, while the cutting bit $c$ operates upon the end of the tooth previously operated upon by bit $b$, and gives to the end of the tooth the finishing dressing. These bits or shoulders $b$ $c$ are made of different sizes and arranged to act successively upon the end portions of the teeth in order that the operations of cutting and dressing the ends may be rendered gradual instead of throwing the entire work upon the single bit or cutter $c$, as is done under the arrangement shown in Fig. 3.

From this construction it will be seen that the single tool accomplishes at one and the same time the forming and dressing of the sides and the ends of the teeth, and also the base or that portion between two adjacent teeth,—a result not hitherto accomplished.

The construction shown in Fig. 1, and just above described, is particularly useful in cutting heavy gears where it is not desired to throw the entire work of cutting, shaping, and dressing the teeth upon the single cutting head F,—the action of the progressive cutting heads C, D and E rendering the work of the cutting head F easier than if the latter were compelled to do the entire work itself. For lighter work, however, I propose to omit the progressive cutting heads C, D, and E, and employ simply the cutting head F, as shown in Fig. 2; the said cutting head under such an arrangement being provided with the central cutting bit $a$ and the cutting shoulders or bits $b$ and $c$.

If desired, the cutting shoulder $b$ may be omitted and only the cutting bit $a$ and the shoulder $c$ be employed. Under this arrangement, which I have illustrated in Fig. 3, the cutting bit $c$ may be set away from the cutting bit $a$ the distance of a tooth, and may be made either integral with the cutting bit $a$ or separate therefrom; but in any event it must be so arranged as to rotate in unison therewith in order that the operation of shaping and finishing all parts of the tooth may be accomplished at one and the same operation.

I am aware that it has been proposed to employ in the manufacture of gear wheels separate and independent male and female cutters wholly disconnected from each other, the former adapted to cut on the radial center line of the space and give form to its sides up to the pitch-line of the gear, and the latter (the female cutter) adapted to work on the radial center line of a tooth and finish the form of both sides of the tooth down to the pitch-line. I am also aware that in order to make a fly cutter or a very fine pitch or gear tooth such as used for watches, it has been proposed to make a templet of such form as to fill a space and a half of each of the neighboring teeth. To such constructions as these I make no claim. Under both of these plans to which I have alluded it is necessary to go completely over the gear wheel at least two times in order to give the desired form to the teeth, whereas under my construction and arrangement the wheel is rendered complete, that is to say, its teeth and intervening spaces are shaped, dressed and finished all at one operation,—a result which has not heretofore been accomplished, so far as I am aware.

Having thus described my invention, what I claim is—

1. In a gear cutter, the cutting head F provided with a central bit $a$, and the different-sized cutting shoulders or bits $b$ and $c$ located upon opposite sides of the central bit and adapted to act successively upon the end of each tooth.

2. In a gear cutter, the combination with the cutting head F having the bits $a$, $b$, and $c$, of the progressive cutting heads C, D and E,—the said cutting heads C, D, E, and F being adapted to rotate in unison, all substantially as shown and described.

In witness whereof I hereunto set my hand in the presence of two witnesses.

CONRAD M. CONRADSON.

Witnesses:
W. R. BAGLEY,
EDWARD M. FULLER.